(12) United States Patent
Khoshkava et al.

(10) Patent No.: US 10,401,963 B2
(45) Date of Patent: Sep. 3, 2019

(54) SMART MATERIAL FOR ELECTROSTATIC HAPTIC FEEDBACK

(71) Applicant: IMMERSION CORPORATION, San Jose, CA (US)

(72) Inventors: Vahid Khoshkava, Montreal (CA); Juan Manuel Cruz-Hernandez, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 445 days.

(21) Appl. No.: 15/339,981

(22) Filed: Nov. 1, 2016

(65) Prior Publication Data

US 2018/0120939 A1 May 3, 2018

(51) Int. Cl.
*H01L 41/09* (2006.01)
*G06F 3/01* (2006.01)

(52) U.S. Cl.
CPC .................. *G06F 3/016* (2013.01)

(58) Field of Classification Search
CPC ........................................ G06F 3/016
USPC ........................ 310/311–371, 800
See application file for complete search history.

(56) References Cited

U.S. PATENT DOCUMENTS

| 8,362,882 | B2 | 1/2013 | Heubel et al. |
| 8,665,241 | B2 | 3/2014 | Heubel et al. |
| 9,058,728 | B2 | 6/2015 | Fantauzza |
| 2013/0248024 | A1* | 9/2013 | Dunn ............ G01L 9/0072 137/551 |
| 2015/0355710 | A1 | 12/2015 | Modarres et al. |
| 2018/0192954 | A1* | 7/2018 | Lumme ............ A61B 5/6831 |
| 2018/0298278 | A1* | 10/2018 | Zhong ............ B82Y 20/00 |

FOREIGN PATENT DOCUMENTS

WO  WO-2017/000980 A1 *  1/2017  ............... A61B 5/11

OTHER PUBLICATIONS

Bellan and Bossis, "Field Dependence of Viscoelastic Properties of MR Elastomers," Int. J. Mod. Phys. B. 16:2447-2453 (2002).
Palleau, et al., "Reversible patterning and actuation of hydrogels by electrically assisted ionoprinting," Nature Communications 4:2257 (2013).
Behl and Lendlein, "Shape Memory Polymers," MaterialsToday, vol. 10, pp. 20-28 (2007).

* cited by examiner

*Primary Examiner* — Thomas M Dougherty
(74) *Attorney, Agent, or Firm* — Medler Ferro Woodhouse & Mills PLLC (57) ABSTRACT

This disclosure relates to a smart material for providing haptic feedback, as well as haptic actuators, and suitably haptic actuation resulting from electroactive materials. Such haptic actuators are useful in structural materials, including as elements of wearables or accessories.

15 Claims, 7 Drawing Sheets

SMART MATERIAL FOR ELECTROSTATIC HAPTIC FEEDBACK

TECHNICAL FIELD

This disclosure relates to a smart material for providing haptic feedback, as well as haptic actuators, and suitably haptic actuation resulting from electrostatic interactions. Such haptic actuators are useful in structural materials, including as elements of wearables or accessories.

BACKGROUND

Haptic feedback for use in wearables or accessories has traditionally been based on the use of eccentric rotating mass (ERM) motors and linear resonant actuator (LRA). However, these types of actuators are typically bulky and often require large amounts of power, making them difficult to integrate into clothing or other wearables or accessories (i.e., jewelry, etc.). Shape memory alloys have also been used in wearables, but again, power consumption often limits their applicability and ease of integration.

What is needed is a simple mechanism for providing haptic feedback to a user that can readily be implemented in wearable and accessory goods.

SUMMARY

This disclosure relates to smart materials comprising electroactive materials for providing haptic feedback to a user, wherein the smart material for providing haptic feedback may be used in various applications, such as wearables and accessory goods.

In exemplary embodiments, provided herein are smart materials for providing haptic feedback to a user. In embodiments, the smart materials include a structural material, an electroactive material associated with the structural material, and a power source connected to the electroactive material.

In additional embodiments, provided herein are methods for providing haptic feedback to a user via a smart material, the smart material, including a structural material, an electroactive material associated with the structural material, and a power source connected to the electroactive material. The methods include transmitting an activating signal to the power source and generating movement of the electroactive material, resulting in actuation of the structural material to provide haptic feedback to the user.

Also provided herein are smart materials for providing haptic feedback to a user, which include a structural material, a conductor associated with the structural material, an insulator associated with the conductor, and a power source connected to the electroactive material, wherein the haptic feedback is an electrostatic interaction provided to the user.

BRIEF DESCRIPTION OF THE DRAWINGS

The foregoing and other features and aspects of the present technology can be better understood from the following description of embodiments and as illustrated in the accompanying drawings. The accompanying drawings, which are incorporated herein and form a part of the specification, further serve to illustrate the principles of the present technology. The components in the drawings are not necessarily to scale.

DETAILED DESCRIPTION

Various embodiments will be described in detail, some with reference to the drawings. Reference to various embodiments does not limit the scope of the claims attached hereto. Additionally, any embodiments set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," "including," "has," and "having" are interchangeable and not intended to be limiting. The term "such as" also is not intended to be limiting. For example, the term "including" shall mean "including, but not limited to."

In embodiments, provided herein are smart materials for providing haptic feedback to a user, which include a structural material and an electroactive material associated with the structural material.

As used herein "smart material(s)" refers to a material that is capable of being controlled such that the response and properties of the material change under the influence of an external stimulus.

As used herein "haptic feedback" or "haptic feedback signal" refer to information such as vibration, texture, and/or heat, etc., that are transferred, via the sense of touch, from a smart material as described herein, to a user.

As used herein, "structural material" means a material used in constructing a wearable, personal accessory, luggage, etc. Examples of structural materials include: fabrics and textiles, such as cotton, silk, wool, nylon, rayon, synthetics, flannel, linen, polyester, woven or blends of such fabrics, etc.; leather; suede; pliable metallic such as foil; Kevlar, etc. Examples of wearables include: clothing; footwear; prosthetics such as artificial limbs; headwear such as hats and helmets; athletic equipment worn on the body; protective equipment such as ballistic vests, helmets, and other body armor. Personal accessories include: eyeglasses; neckties and scarfs; belts and suspenders; jewelry such as bracelets, necklaces, and watches (including watch bands and straps); and wallets, billfolds, luggage tags, etc. Luggage includes: handbags, purses, travel bags, suitcases, backpacks, and including handles for such articles, etc.

As used herein, an "electroactive material" refers to a material that exhibits a change in shape or size when stimulated by an electric field (either direct or alternating current). Exemplary electroactive materials, as described herein, include electroactive polymers and piezoelectric materials.

Figures 1A, 1B:
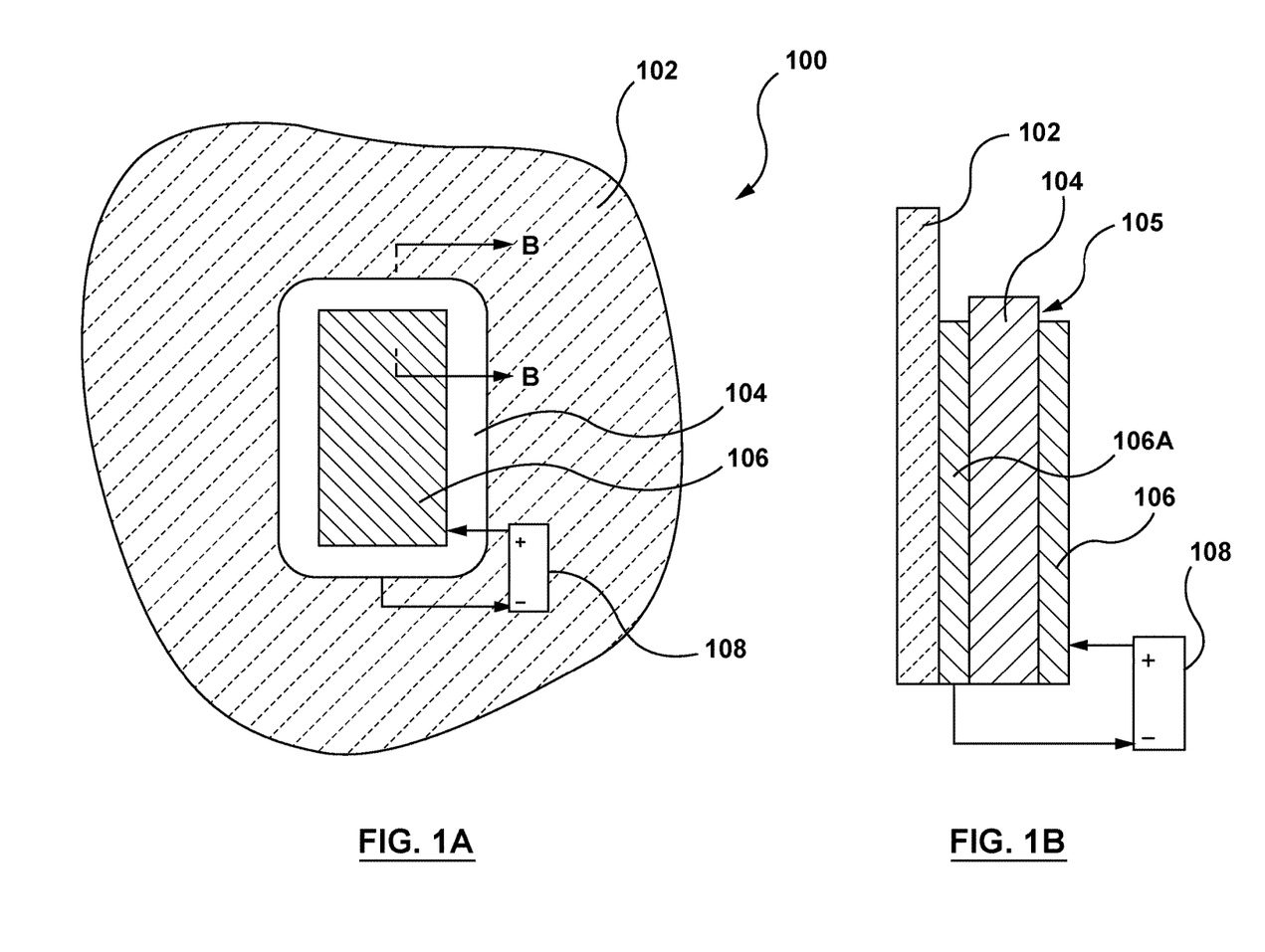
FIG. 1A shows a smart material for providing haptic feedback in accordance with an embodiment hereof.
FIG. 1B shows a sectional view of the smart material of FIG. 1A, taken through line B-B, in accordance with an embodiment hereof.

FIG. 1A shows an exemplary embodiment of a smart material 100 as provided herein, including a structural material 102 and an electroactive material 104 associated with structural material 102. Also shown in FIG. 1A is a power source 108, which is suitably connected to electroactive material 104, so as to provide the electric field required to stimulate movement, i.e., the change in shape and/or size, of electroactive material 104.

As shown in FIG. 1A, electroactive material 104 can also include an electrode 106 associated with an outer surface 105 (see FIG. 1B) of electroactive material 104. An exemplary placement of electrode 106 is shown in FIG. 1B, showing a sectional view of smart material 100 in FIG. 1A, taken through line B-B. As shown in FIG. 1B, an additional electrode 106A can be positioned between electroactive material 104 and structural material 102, so as to provide the electric field discussed herein. In further embodiments, however, the required electric field may be provided from a single electrode positioned on either side of electroactive material 104, or can be a continuous electrode that covers a portion of electroactive material 104 so as to provide the required electric field.

As used herein "associating" refers to any mechanism by which electroactive material 104 is connected or attached to structural material 102, and similarly any mechanism by which electrode 106 is connected or attached to electroactive material 104 (and/or by which electrode 106 may be attached to structural material 102). Various mechanisms for associating or attaching electroactive material 104 to structural material 102 can be used. For example, electroactive material 104 can be integrated into structural material 102. Electroactive material 104 can be made part of structural material 102 during formation of structural material 102, such as during weaving or sewing of a textile, etc. That is, electroactive material 104 can be directly sewn into a textile or fabric, for example, between two pieces of a textile.

In additional embodiments, electroactive material 104 can be fixedly attached to structural material 102. In such embodiments, electroactive material 104 can be glued, taped, stitched, adhered, stapled, tacked, or otherwise attached to structural material 102. Electroactive material 104 can also be integrated into, or on, various substrates, e.g., polymers such as rubbers, silicones, silicone elastomers, Teflon, or poly(ethylene terephthalate), etc., in the form of patches, ribbons or tapes that can then be attached to structural material 102 (e.g., adhered or sewn). Similarly, electrode 106 can be attached to electroactive material 104 via various glues, adhesives, etc. Electrode 106 is suitably prepared from a conductive metal or polymer (e.g., thin films of Au, Al, Ag, Cr, poly(3,4-ethylenedioxythiophene) polystyrene sulfonate (PEDOT:PSS), etc.) that can be applied to electroactive material 104 to create the final structure for association with structural material 102.

Electroactive material 104 can be prepared in any desired shape or orientation for association with structural material 102. Including, for example, as various patches, discs, plates, ribbons, layers, rods, etc. The size of electroactive material 104 is generally dictated by the final desired use, and can be on the order of a few centimeters to tens of centimeters in both length and width, or can be larger depending on the desired use and application. Electroactive material 104 will suitably have a thickness on the order of about 5 µm to millimeters, e.g., about 1 µm to 5 mm, about 1 µm to 1 mm, about 1 µm to 500 µm, or about 5 µm to about 500 µm, or about 10 µm to 500 µm, or about 1 µm to about 100 µm, though thicker or thinner electroactive materials can also be utilized, depending on the desired use and orientation for the electroactive material with the structural material.

In exemplary embodiments, electroactive material 104 is an electroactive polymer, which includes polymers such as, but not limited to, poly(vinylidene fluoride), poly(pyrrole), poly(thiophene), poly(aniline) and mixtures, co-polymers, and derivatives thereof. Exemplary classes of electroactive polymers for use as electroactive material 104 include dielectric and ionic polymers. A dielectric polymer may be made to change shape in response to an electrostatic force being generated between two electrodes that then squeezes the polymer. Dielectric polymers are capable of very high strains and are fundamentally a capacitor that changes its capacitance when a voltage is applied by allowing the polymer to compress in thickness and expand in area due to the electric field. An ionic polymer may undergo a change in shape or size due to displacement of ions inside the polymer. In addition, some ionic polymers require the presence of an aqueous environment to maintain an ionic flow.

Methods of preparing electroactive polymers are known in the art, and can suitably include dissolving a desired polymer in a suitable solvent, and then casting the polymer in the desired shape (i.e., flat ribbon, patch, etc.). Alternatively, the polymer may be drawn, or subjected to fiber spinning techniques, so as to be prepared with the desired filament dimensions, as described herein. Additional methods include melt mixing, in which the polymer is heated above the softening/melting point, and then the polymer film is processed using film processing (casting or blowing) techniques. The electroactive polymers, if prepared as relatively flat structures, can also be prepared by layering various polymer sections or layers to create the final desired structure.

In additional embodiments, electroactive material 106 is a piezoelectric material, including piezoelectric composites and ceramics. Exemplary piezoelectric materials include, but are not limited to, barium titanate, hydroxyapatite, apatite, lithium sulfate monohydrate, sodium potassium niobate, quartz, lead zirconium titanate (PZT), tartaric acid and polyvinylidene difluoride fibers. Other piezoelectric materials known in the art can also be used in the embodiments described herein.

In further embodiments, an additional structural polymer or substrate can be used to provide mechanical support to electroactive material 104 and/or electrode 106, to allow for easier association with structural material 102, i.e., to provide a structural, support substrate to bond to structural material 102. Use of an additional mechanical support can also help in providing a higher mechanical force when electroactive material 104 is activated, allowing for more movement of structural material 102, or faster vibrations with higher force.

Figures 2A, 2B:
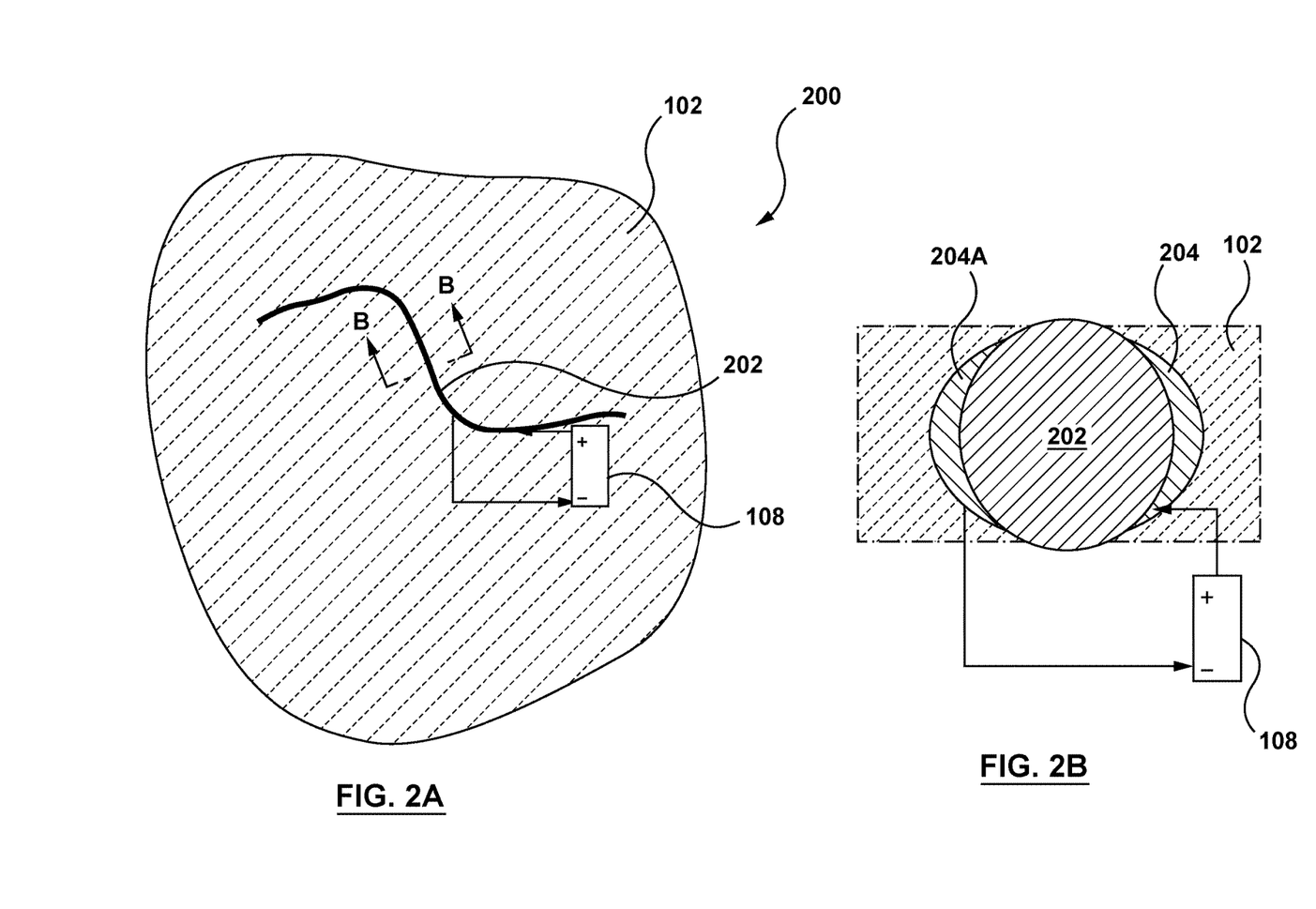
FIG. 2A shows an additional smart material for providing haptic feedback in accordance with an embodiment hereof.
FIG. 2B shows a sectional view of the smart material of FIG. 2A, taken through line B-B, in accordance with an embodiment hereof.

In additional embodiments, a smart material 200, as shown in FIG. 2A, can comprise an electroactive polymer as a filament 202, which is integrated into structural material 102. As used herein "integrated" refers to filament 202 being woven, sewn, stitched, or otherwise made a part of structural material 102, such that it is not readily removed or disassociated from structural material 102. That is, filament 202 can act as a fiber or thread during preparation of structural material 102 or for integration into an already formed structural material. In integrating filaments into structural material 102, it is generally desirable to orient the filaments in a parallel or other orientation such that when activated, their movement in concert results in movement of the structural material, rather than cancelling out their changes in shape or size. For example, if filaments are placed in perpendicular orientation, movement of the filaments in directions orthogonal to one another would generally result in no or very little net movement, of a structural material in which the filaments are integrated.

FIG. 2B shows a sectional view of smart material 200 taken through line B-B, illustrating filament 202 and structural material 102, as well as electrodes 204, 204A at least partially surrounding or covering the outside of filament 202. Filament 202 is suitably a slender, threadlike or fibrous structure, often having a substantially circular or oval cross-section, though other shapes can be utilized. Filament 202 can take the form of a wire or thread made from an electroactive material, including for example, an electroactive polymer as described herein. Electrodes 204, 204A can be applied to filaments 202 by using various methods, including dip coating, spraying, electro-plating, doping, thin film coating, vapor deposition, etc. Filaments generally have a cross-sectional area on the order of a few hundred microns to tens of millimeters, and lengths on the order of millimeters, to centimeters, to hundreds of centimeters, though longer lengths can also be utilized depending on the desired application.

As described herein, smart materials 100 or 200, can further comprise power source 108 connected to electroactive material 104, or filament 202 (i.e., an electrical connection or wireless power connection). In embodiments, power source 108 can be permanently connected to electroactive material 104 or filament 202, or in other embodiments, can be separate from the electroactive material or the filament, and later connected. As described herein, the electroactive materials 104 can include electrode(s) 106, 106A, to establish a connection between electroactive material 104 and power source 108 (see FIG. 1B), or as shown in FIG. 2B, filament 202 can include electrodes 204, 204A surrounding all or a portion of the filament to facilitate connection to power source 108. Power source 108 can come as an integrated component of smart materials 100 or 200, or can be provided separately, or later provided, to supply power. The amount of power provided by power source 108 is suitably on the order of about 0.1 Watts (W) to about 10 W, or more suitably about 0.5 W to about 5 W, or about 1 W to about 5 W, or about 0.5 W, about 1 W, about 2 W, about 3 W, about 4 W or about 5 W. Exemplary power sources 108 including various battery packs as well as solar energy sources. Power source 108 can also include a rechargeable system, for example, a system capable of recharging through the use of a piezoelectric material as electroactive material 104, as described herein, providing a current to the system.

In embodiments, smart material 100 or 200, and thus structural material 102, can be incorporated into wearable articles, such as, wearables textiles, including shirts, blouses, hats, jackets, coats and pants/shorts, resulting in a wearable smart material. The structural materials can also be integrated into accessories, including various leather goods, including wallets and purses, handbags (including handles of such), backpacks, and jewelry, etc.

In additional embodiments, provided herein are methods for providing haptic feedback to a user via a smart material. As described herein, the smart material includes the structural material, the electroactive material associated with the structural material, and suitably the power source connected to the electroactive material.

Figure 3A:
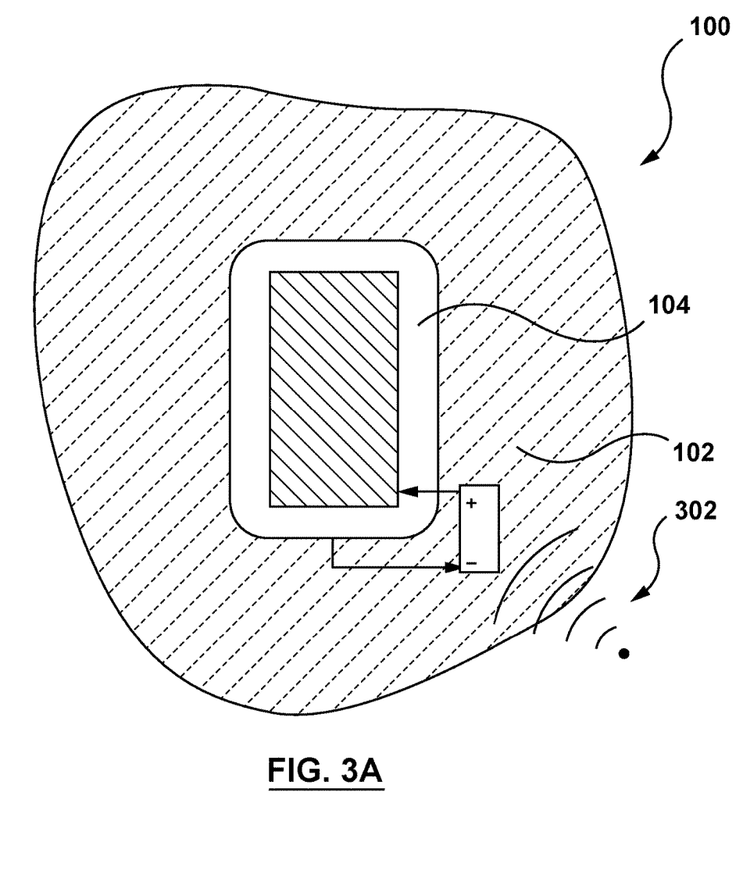
FIGS. 3A-3B show movement of a smart material in accordance with an embodiment hereof.
Figure 3B:
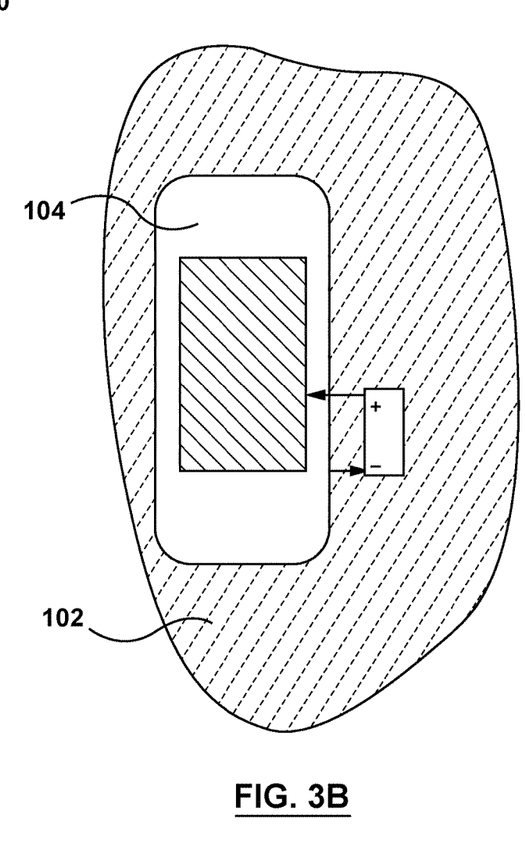

The methods described herein, as shown illustratively in FIGS. 3A and 3B, include transmitting an activating signal 302 to the power source. The activating signal triggers the generating of movement of the electroactive material 104, for example a shape change or size change, as shown in FIG. 3B, and thus the movement and actuation of the structural material 102 to provide haptic feedback to a user. For example, in embodiments where the structural material is part of a wearable, the actuation causes the structural material to move, providing a haptic feedback to a user in the form of movement in an article of clothing (e.g., shirt, tie, blouse, pants), or as part of an accessory, including a watch, bracelet, etc.

Exemplary activating signals can be from a cellular phone, tablet, computer, car interface, smart device, game console, etc., and can indicate for example the receipt of a text message or e-mail, phone call, appointment, etc.

In further embodiments, a controller is also suitably included to provide an interface between the device and smart materials, as described herein. Components of a controller are well known in the art, and suitably include a bus, a processor, an input/output (I/O) controller and a memory, for example. A bus couples the various components of controller, including the I/O controller and memory, to the processor. The bus typically comprises a control bus, address bus, and data bus. However, the bus can be any bus or combination of busses suitable to transfer data between components in the controller.

A processor can comprise any circuit configured to process information and can include any suitable analog or digital circuit. The processor can also include a programmable circuit that executes instructions. Examples of programmable circuits include microprocessors, microcontrollers, application specific integrated circuits (ASICs), programmable gate arrays (PGAs), field programmable gate arrays (FPGAs), or any other processor or hardware suitable for executing instructions. In the various embodiments, the processor can comprise a single unit, or a combination of two or more units, with the units physically located in a single controller or in separate devices.

An I/O controller comprises circuitry that monitors the operation of the controller and peripheral or external devices. The I/O controller also manages data flow between the controller and peripherals or external devices. Examples of peripheral or external devices with the which I/O controller can interface include switches, sensors, external storage devices, monitors, input devices such as keyboards, mice or pushbuttons, external computing devices, mobile devices, and transmitters/receivers.

The memory can comprise volatile memory such as random access memory (RAM), read only memory (ROM), electrically erasable programmable read only memory (EE-RPOM), flash memory, magnetic memory, optical memory or any other suitable memory technology. Memory can also comprise a combination of volatile and nonvolatile memory.

The memory is configured to store a number of program modules for execution by the processor. The modules can, for example, include an event detection module, an effect determination module, and an effect control module. Each program module is a collection of data, routines, objects, calls and other instructions that perform one or more particular task. Although certain program modules are disclosed herein, the various instructions and tasks described for each module can, in various embodiments, be performed by a single program module, a different combination of modules, modules other than those disclosed herein, or modules executed by remote devices that are in communication with the controller.

In embodiments described herein, the controller, which can include a wireless transceiver (including a Bluetooth or infrared transceiver), can be integrated into structural material 102 or separate from the structural material. In further embodiments, the controller can be on a separate device from the structural material, but is suitably connected via a wired or more suitably a wireless signal, so as to provide activating signal 302 to the various components of the systems and smart materials described herein.

For example, the controller can provide activating signal 302 to actuator drive circuit, which in turn communicates with power supply 108, of the smart materials described herein, so as to provide haptic feedback to a user of a smart material or system as described herein. For example, desired haptic feedback can occur, for example, when a mobile phone or other device to which a controller is paired via wireless connection receives a message or email. Additional examples include a controller being associated with devices such as game controllers, systems or consoles, computers, tablets, car or truck interfaces or computers, automated payment machines or kiosks, various keypad devices, televisions, various machinery, etc. In such embodiments, the controller suitably provides activating signal 302 to an actuator drive circuit, to provide haptic feedback to a user in response to a signal originated by or from an external device. The device can also be a part of the wearable on which the various components of the haptic feedback systems described herein are contained. Exemplary feedback or signals that can be provided by a device, include, for example, indications of incoming messages or communication from a third party, warning signals, gaming interaction, driver awareness signals, computer prompts, etc.

In further embodiments, the smart materials and components described herein can be integrated with or be part of a virtual reality or augmented reality system. In such embodiments, the smart materials can provide haptic feedback to a user as he or she interacts with a virtual or augmented reality system, providing responses or feedback initiated by the virtual reality or augmented reality components and devices.

Figure 4A:
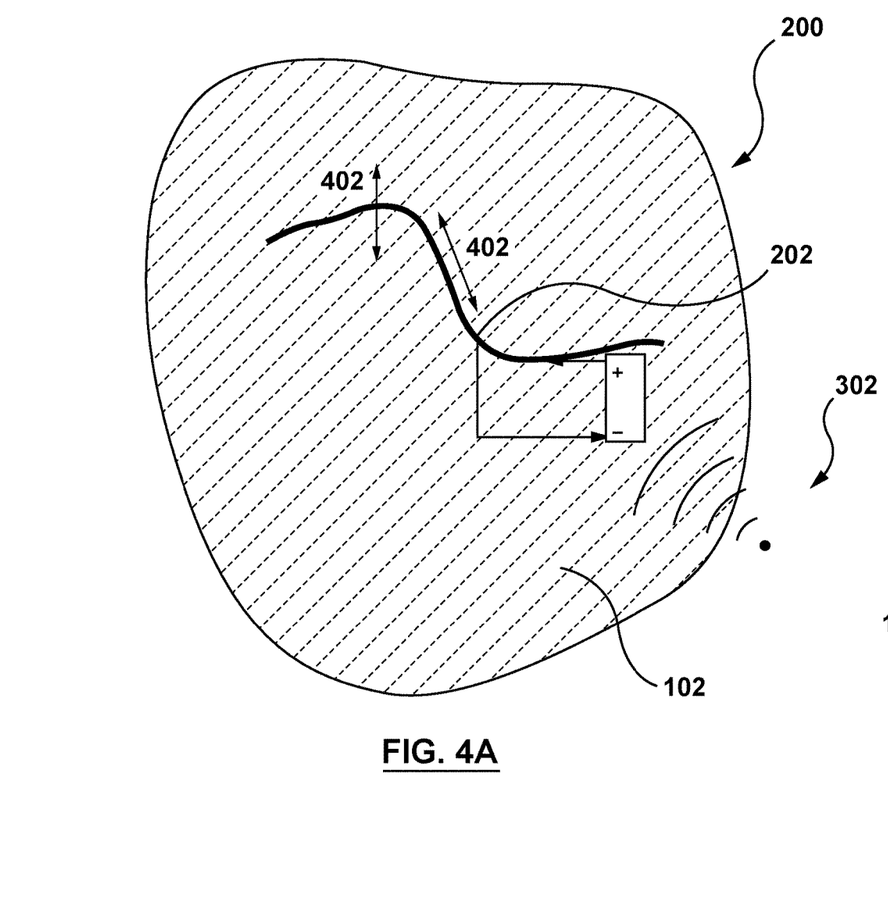
FIGS. 4A-4B show movement of an additional smart material in accordance with an embodiment hereof.
Figure 4B:
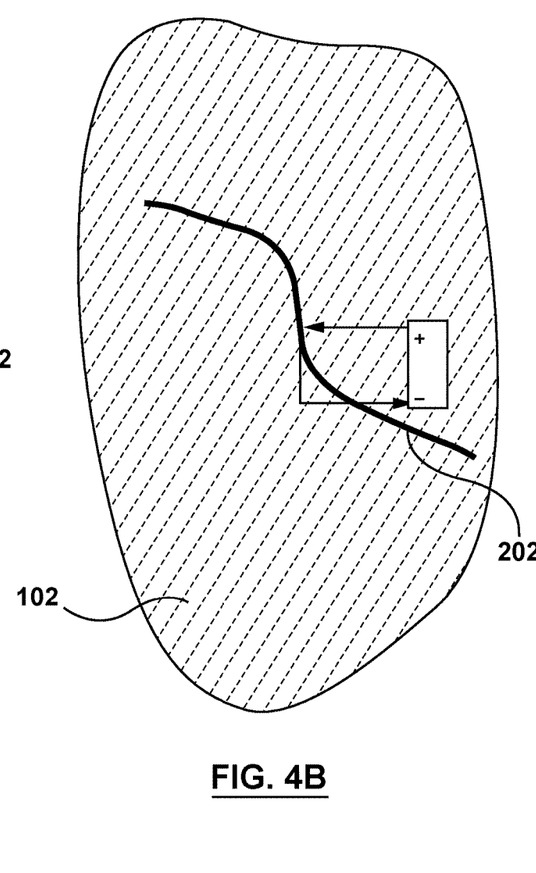

FIGS. 4A and 4B show the actuation and movement of an electroactive material in the form of the filament 202 described herein integrated into the structural material 102. Upon transmission of an activating signal 302, the filament changes shape or size. For example, a movement may be generated along one or both of a longitudinal axis (402) of the filament 202, i.e., along a length of the filament, or a cross-sectional axis (404) of the filament 202, i.e., across a width of the filament. The movement results in a lengthening or shortening of the filament, or a change in shape as the filament is compressed or extended. In response to the actuation of the filament 202, the structural material 102 in which the filament is integrated, moves (see FIG. 4B), providing haptic feedback to the user.

In further embodiments, provided herein are smart materials which incorporate electrostatic forces, or electrostatic feedback/interaction, for providing haptic feedback to a user.

Figure 5A:
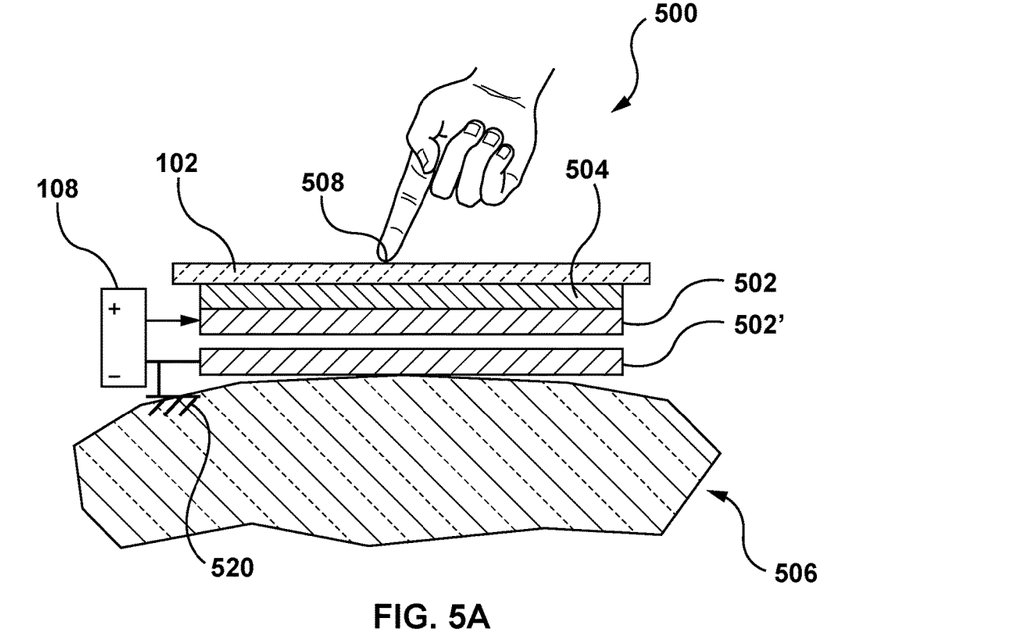
FIGS. 5A-5C show smart materials based on electrostatic feedback in accordance with embodiments hereof.

For example as shown in FIG. 5A, a smart material 500 includes structural material 102, a conductor 502 associated with the structural material and an insulator 504 associated with conductor 502. Also suitably included is power source 108, which is connected to conductor 502, and also suitably connected to ground 520. In other embodiments, as shown in FIG. 5A, power source 108 can be connected to a second conductor 502'.

Upon interaction with smart material 500, for example via a user touch 508, haptic feedback is provided via an electrostatic interaction or electrostatic feedback to the user. The electrostatic feedback can be in the form of a short vibration or pulse, or an extended vibration to the user. The frequency of the electrostatic feedback or interaction can be on the order of about 1 Hz to about 1000 Hz, more suitably about 1 Hz to about 500 Hz, about 1 Hz to about 200 Hz, about 10 Hz to about 200 Hz, about 10 Hz to about 100 Hz, or about 10 Hz, about 20 Hz, about 30 Hz, about 40 Hz, about 50 Hz, about 60 Hz, about 70 Hz, about 80 Hz, about 90 Hz or about 100 Hz. Haptic feedback can also be provided by the electrostatic interaction if a user simply approaches, or is near, the smart material, signaling a close proximity to the smart material, which may result in the electrostatic interaction and the haptic feedback therefrom.

Exemplary materials useful as conductors are known in the art, and include for example, various metals and conductive polymers. Materials useful as insulators are well known in the art, and include polymeric materials, rubbers, plastics, ceramics etc. In embodiments, the materials selected for conductors and insulators are suitably thin materials, on the order of 1 μm to 100 mm in thickness, more suitably about 1 μm to 10 mm, and are selected so as to be flexible such that when the structural material is part of a textile or fabric, including as a wearable, the materials can bend and conform to the various shapes necessary during wearing by a user, while still providing the desired electrostatic feedback.

In embodiments, for example as shown in FIG. 5A, insulator 504 is positioned between structural material 102 (e.g., a wearable article) and conductor 502. In such embodiments, a user's body 506 (e.g., arm, leg, torso, head, neck, etc.) can act as a ground (520) for the electrostatic interaction, whereby the haptic feedback is provided or felt via the user's touch 508 (or close approach). The thickness of insulator 504 will generally be on the order of microns, for example 5-50 microns, or about 5-20 microns, or about 5, 10, 20, 30, 40 or 50 microns.

Figure 5B:
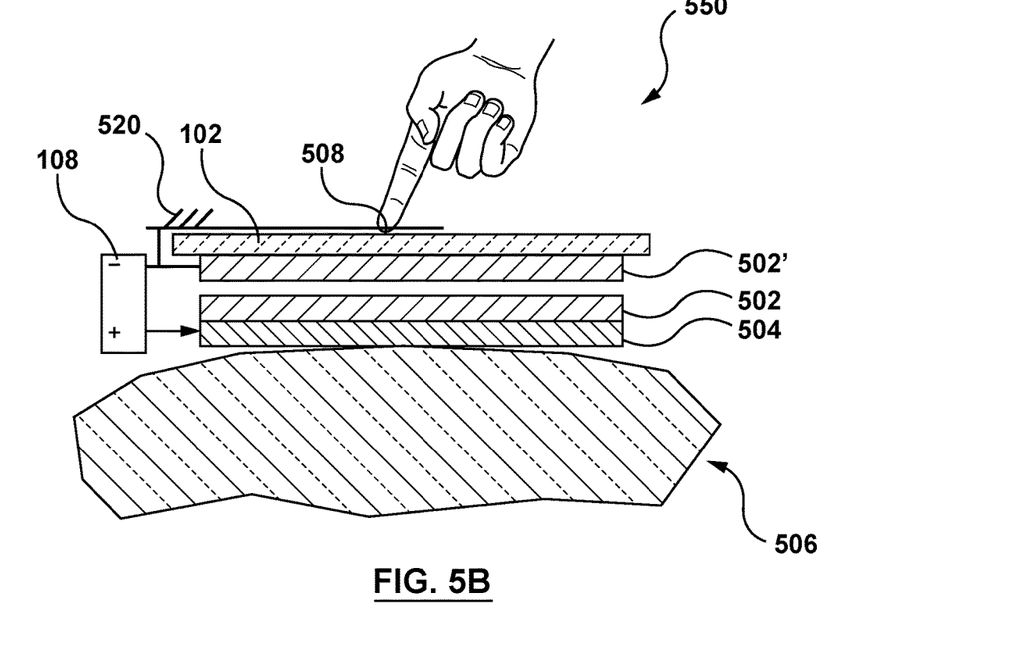

In further embodiments, for example as shown in FIG. 5B, smart material 550 includes insulator 504 positioned between conductor 502 and the user (e.g., user's body 506). In such embodiments, the user's touch 508 can act as ground 520 for the electrostatic interaction, whereby the haptic feedback is provided or felt via the user's body 506, rather than through user's touch 508 (or close approach). Or, as shown in FIG. 5B, power source can be connected to a further conductor 502'.

Figure 5C:
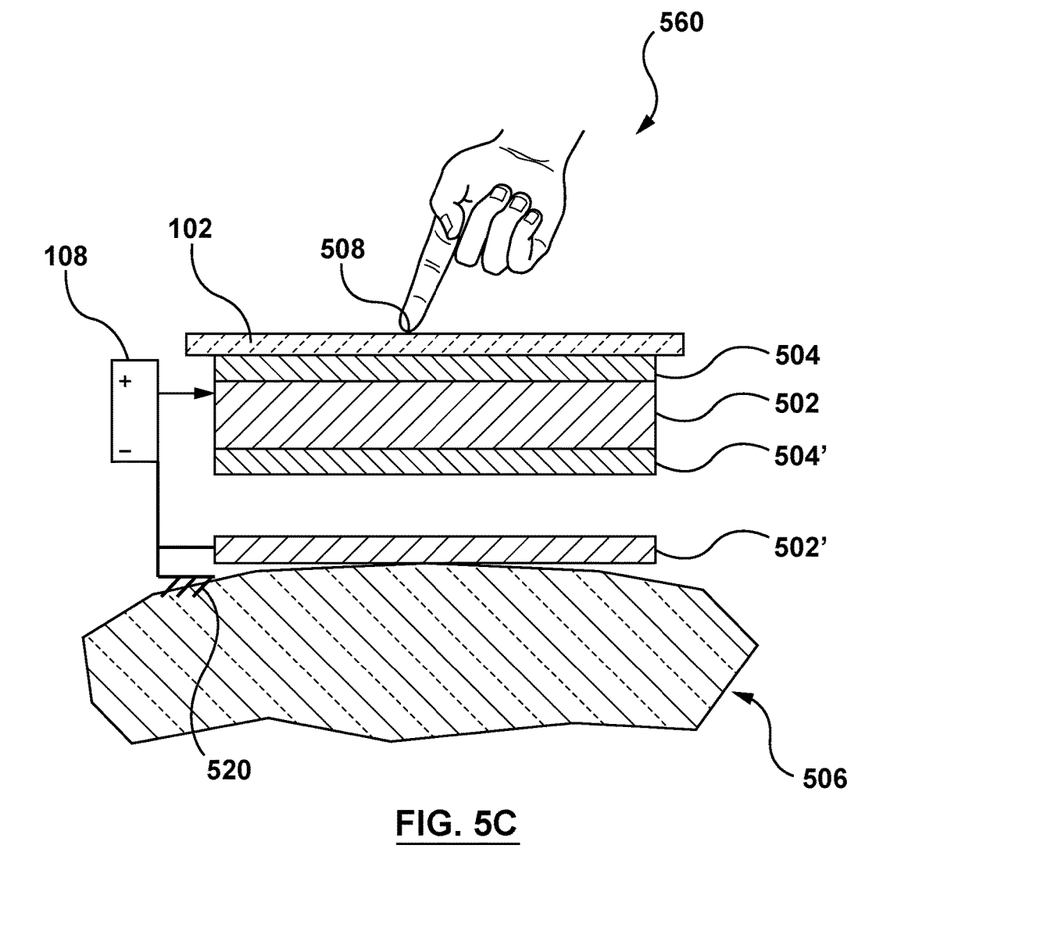

In still further embodiments, as shown in smart material 560 in FIG. 5C, insulators 504 and 504' can be positioned between both conductor 502 and user (i.e., user's body 506), as well as between conductor 502 and structural material 102. In such embodiments, the haptic feedback in the form of an electrostatic interaction can be felt by either, or both, user's body 506 and/or user's touch 508. Again, power source 108 can be connected to ground or second conductor 502'.

As described herein, structural material 102 is suitably a textile, and can be part of a wearable, providing a way to provide haptic feedback to a user in the form of an electrostatic interaction or electrostatic feedback, for example, using the embodiments illustrated in FIGS. 5A-5C.

Figure 6A:
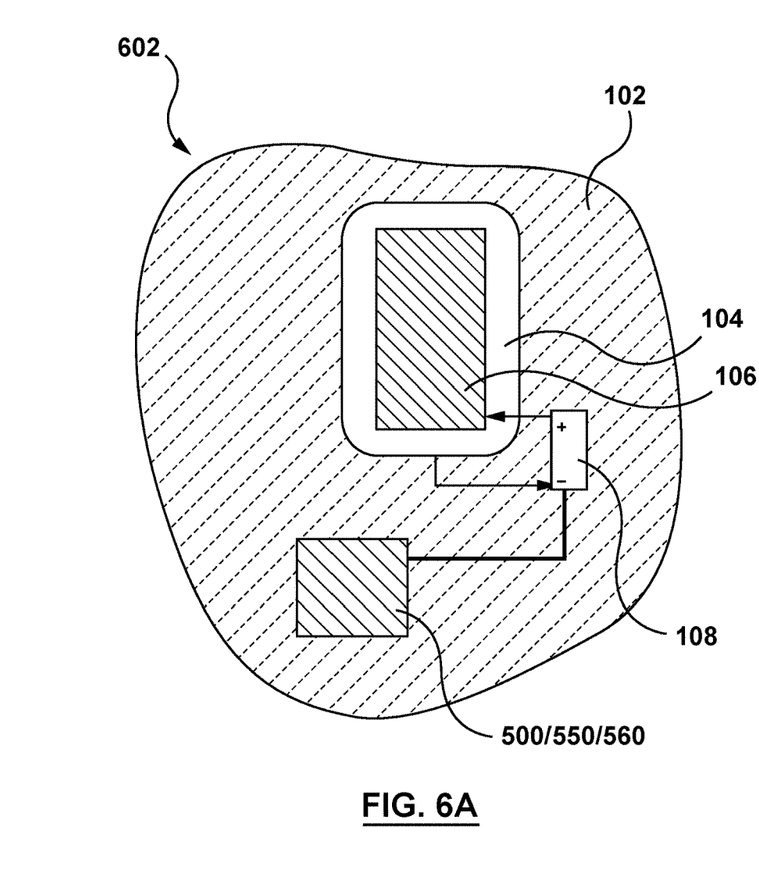
FIGS. 6A-6B show smart materials based on a combination of an electroactive material and electrostatic feedback in accordance with embodiments hereof.
Figure 6B:
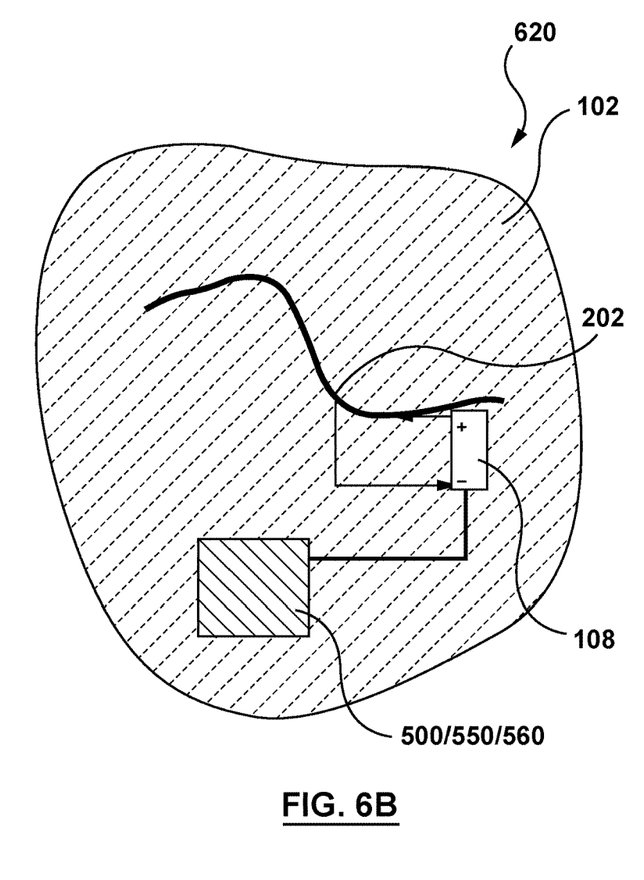

In still further embodiments, as illustrated in FIGS. 6A and 6B, provided herein are combination smart material 602 and combination smart material 620. As shown in FIG. 6A, a smart material which includes structural material 102 and electroactive material 104 associated with structural material 102, can be provided. Combination smart material 602 can also further include smart material 500, 550 or 560, which includes the conductor associated with the structural material and the insulator associated with the conductor. As described herein, smart materials 500, 550 and 560, can include various orientations of the conductor(s) and insulator(s) in such embodiments, providing different configurations that will provide an electrostatic interaction. FIG. 6B illustrates combined smart material 620, in which the electroactive material is filament 202. As shown in FIG. 6A, power source 108 is suitably connected to both electroactive material 104, and the conductor(s) within smart material 500, 550 or 560. Similarly, in FIG. 6B, power source is connected to both filament 2020 and conductor(s) within smart material 500, 550 or 560.

Upon activation, power source 108 provides power so as to generate movement of electroactive material 104, as well as an electrostatic interaction via smart material 500, 550 or 560, which incorporate electrostatic forces.

Exemplary structural materials and electroactive materials useful in combination smart materials 602 and 620 are described herein, as are orientations and components of smart materials 500, 550 and 560, for providing electrostatic interactions.

Also provided herein are methods for providing haptic feedback utilizing the combined smart materials described herein. For example, a smart material that includes the combination of the electroactive material(s) and the electrostatic smart materials described herein is provided. Suitably, the combination smart material would include the structural material, the electroactive material associated with the structural material, the conductor associated with the structural material and the insulator associated with the conductor, as well as the power source connected to the electroactive material and to the conductor.

In embodiments of the methods, the activating signal(s) described herein is transmitted to the power source. Movement is then generated in the electroactive material, resulting in actuation of the structural material. In addition, an electrostatic interaction is generated. The combination of the movement of the electroactive material and the electrostatic interaction provide haptic feedback to the user. In various embodiments, the order, sequence, frequency, and intensity of both the movement of the electroactive material and electrostatic interaction can be varied, depending on the type of interaction or the type of desired feedback.

For example, in embodiments, a user may experience haptic feedback from the movement of the electroactive material, upon which the user may interact with the structural material, creating an electrostatic interaction which provides additional, further haptic feedback. In further embodiments, the user may interact with the structural material, which in turn provides an electrostatic interaction, and the structural material may further provide movement from the electroactive material to provide the haptic feedback.

Examples of intensity, frequency and timing of the various haptic feedback are provided herein, and can be tailored as desired by the user or the device with which the user is interacting. Examples of devices and methods for activating the combined smart materials are described herein, and include various computers, mobile devices, gaming systems, automobiles, etc.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A smart material for providing haptic feedback to a user, comprising:
   a. a structural material;
   b. an electroactive material in filament form associated with the structural material, wherein the electroactive material comprises an electroactive polymer;
   c. a conductor associated with the structural material and an insulator associated with the conductor; and
   d. a power source connected to the electroactive material and to the conductor,
   wherein the haptic feedback includes both movement of the electroactive material and an electrostatic interaction.

2. The smart material of claim 1, wherein the electroactive material further comprises an electrode associated with an outer surface of the electroactive material.

3. The smart material of claim 1, wherein the electroactive polymer comprises poly(vinylidene fluoride), poly(pyrrole), poly(thiophene), poly(aniline) and mixtures, co-polymers, and derivatives thereof.

4. The smart material of claim 1, wherein the electroactive material is fixedly attached to the structural material.

5. The smart material of claim 1, wherein the electroactive material comprises a piezoelectric material.

6. The smart material of claim 1, wherein the structural material is a textile.

7. The smart material of claim 1, wherein the structural material is part of a wearable.

8. The smart material of claim 1, wherein the insulator is positioned between the conductor and the structural material.

9. The smart material of claim 1, wherein the insulator is positioned between the conductor and the user.

10. A method for providing haptic feedback to a user via a smart material, the method comprising:
    i. providing a smart material including,
       a. a structural material;
       b. an electroactive material in filament form associated with the structural material, wherein the electroactive material comprises an electroactive polymer;
       c. a conductor associated with the structural material and an insulator associated with the conductor; and
       d. a power source connected to the electroactive material and to the conductor;
    ii. transmitting an activating signal to the power source; and
    iii. generating movement of the electroactive material along a longitudinal axis and/or a cross-sectional axis of the filament, resulting in actuation of the structural material to provide haptic feedback to the user, and generating an electrostatic interaction to provide haptic feedback to the user.

11. The method of claim 10, wherein the electroactive polymer comprises poly(vinylidene fluoride), poly(pyrrole), poly(thiophene), poly(aniline) and mixtures, co-polymers, and derivatives thereof.

12. The method of claim 10, wherein the electroactive material comprises a piezoelectric material.

13. The method of claim 10, wherein the structural material is part of a wearable.

14. The smart material of claim 1, wherein the electroactive material is in the form of more than one filament, and wherein the filaments are in a parallel orientation in the structural material.

15. The method of claim 10, wherein the electroactive material is in the form of more than one filament, and wherein the filaments are in a parallel orientation in the structural material.

* * * * *